March 4, 1969
L. G. CLAWSON ET AL
3,430,483
DETERMINATION OF VAPOR QUALITY
Filed Feb. 25, 1966
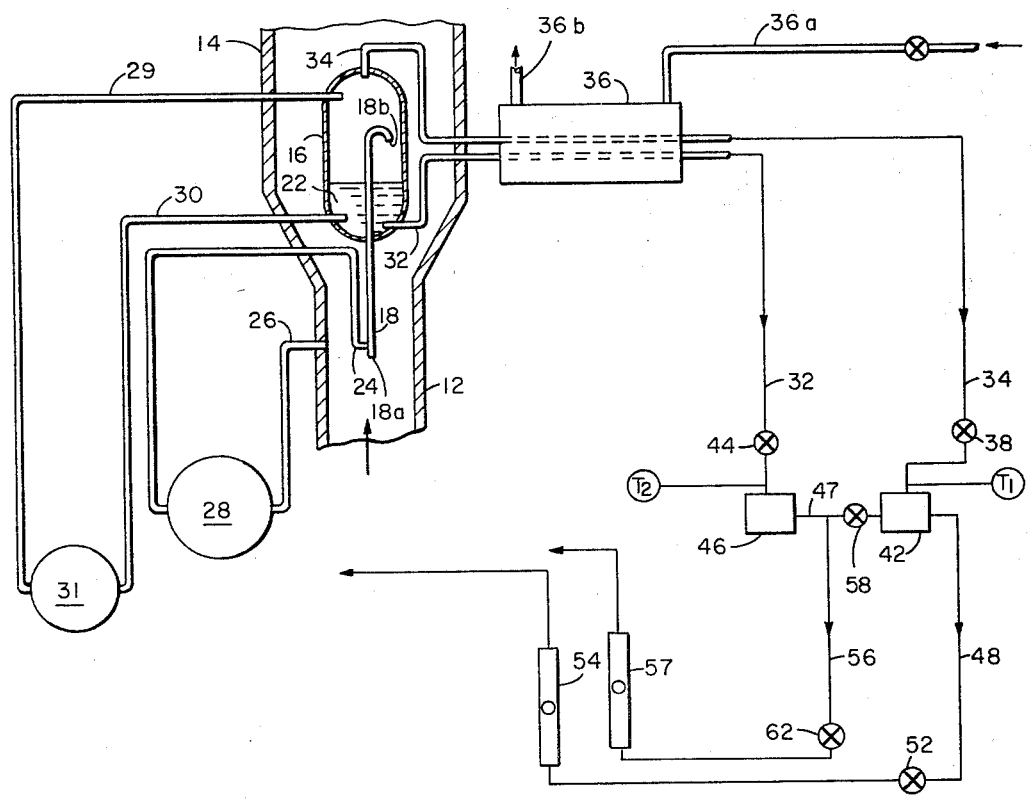
INVENTOR.
LAWRENCE G. CLAWSON
BY MARVIN B. ZIERING United States Patent Office 3,430,483
Patented Mar. 4, 1969

3,430,483
DETERMINATION OF VAPOR QUALITY
Lawrence G. Clawson, Dover, and Marvin B. Ziering, Newton Highlands, Mass., assignors to the United States of America as represented by the United States Atomic Energy Commission
Filed Feb. 25, 1966, Ser. No. 532,527
U.S. Cl. 73—29      4 Claims
Int. Cl. G01n 31/00, 11/00

ABSTRACT OF THE DISCLOSURE

Apparatus for determining the vapor quality of wet steam utilizing a sampler and a liquid-vapor separator. The vapor portion is condensed and then recombined with the liquid portion. Measurement of liquid flow at various points in the system and that of conductivity due to impurities provides the vapor quality of the original sample.

---

The present invention relates to the determination of the vapor quality of a liquid vapor mixture and more particularly to the determination of the vapor quality of a liquid vapor mixture utilizing the conductivity characteristics of the fluids involved.

The invention described herein was made in the course of, or under a contract with the U.S. Atomic Energy Commission.

The successful design and operation of high-power boiling systems depend to a large extent upon understanding the boiling process which is characterized by various distributions of the liquid and vapor phases at a given cross section of the flow. More complete information as to these flow regimes requires improved techniques for determining their characteristics including that of observing and measuring the physical characteristics including vapor quality of a vapor-liquid fluid mixture.

Dealing with a vapor-liquid mixture is a far more complicated procedure than dealing with a single phase gas or liquid. In the single phase situation, measurement of pressure and temperature of the sample will provide a complete description. In the two phase case, however, pressure and temperature are not independent properties of the sample so that it becomes necessary either to extend the measurements to that of some third property or a new measuring procedure must be applied.

One technique presently in use for the determination of the vapor quality of a two phase flow regime involves the selection of a suitable sample of the fluid, as by a proper pitot tube arrangement, and then expanding the mixture down to the liquid, single phase state. Through the application of the energy equation for steady state conditions and a vapor enthalpy pressure diagram, and with proper measurement of the pressure and temperature conditions before and after expansion it is possible to calculate the vapor quality of the original fluid. This technique has a very limited range of operation and is not suitable for use under the extended range conditions now being studied.

A modified approach to that of obtaining this information and which has a more extended range of operation involves adding heat to the sample for raising its enthalpy. However, this procedure introduces new and substantial sources of error and under certain conditions with best available equipment it is possible that measurement of sample liquid flow rates can be in error by as much as 100% and more.

The present invention overcomes the problems associated with the above-mentioned technique by resorting to a unique sample liquid-vapor separator and conductivity cell extraction and measuring system for measuring the vapor quality of wet steam. A sample of the two-phase fluid is extracted and emptied into a separator from where the liquid and vapor are removed separately. Both flows are cooled to a low temperature liquid phase and then directed either through a conductivity cell rotameter system, or in a special case, through a rotameter flow measuring system. In the former case, the conductivity of the separated liquid flow is measured as it flows through a cell. Then it is mixed with the accompanying condensed vapor flow and directed through another conductivity cell. The total mixture finally flows through another rotameter. The relative conductivity readings give the quality of the sample and the rotameter gives the total sample flow rate.

It is thus a principal object of this invention to provide apparatus for determining the vapor quality and flow rate of a vapor-liquid mixture.

Another object of the invention is to utilize conductivity measurements to determine the thermodynamic state of a flowing vapor-liquid mixture.

A further object is apparatus for separating the phases in a vapor-liquid mixture to determine the vapor quality of said mixture.

Other objects and advantages of this invention will hereinafter become obvious from the following description of preferred embodiments of this invention taken with the accompanying drawing in which is illustrated apparatus for extracting and analyzing wet steam samples in accordance with this invention.

This invention has particular application to that of measuring the vapor quality of wet steam and is feasible because the steam vapor, even when condensed, has virtually zero conductivity. All steam loop systems, even those with full demineralization, have enough impurities to give a finite liquid conductivity reading. As this water travels through the heated section of such a system and is made to boil, these impurities concentrate in the liquid not vaporized. Except for entrained or dissolved oxygen or ammonia, the vaporized steam has no concentration of impurities and, thus, can have no conductivity. Thus, by separating a sample into liquid and vapor, the impurities are actually being separated out of the sample and concentrated in the separated liquid phase. If the conductivity of the liquid phase is $C_w$ and the conductivity of the mixture is $C_m$, and since the condensed vapor phase can have no impurity concentration and will thus merely dilute the impurity concentration of the liquid phase, it can be shown that as long as the liquid level in the separator (where separation takes place) is held constant, the vapor quality $Q_s$ of the sample measured over a steady state time interval must be:

$$Q_s = 1 - \frac{C_m}{C_w}$$

Even if some liquid carryover in the vapor occurs during the separation process, as long as there is no vapor carryunder out the bottom of the separator and a constant level is maintained, this simple equation for the sample quality is valid.

With conductivity meter accuracies and readabilities of ±3%, the liquid phase content of all samples can be ascertained within $$1 - \frac{1 \pm .03}{1 \pm .03} = 6\%$$

so that the vapor quality of all samples can be ascertained with $(1-Q_s) \times .06$. Of course, at extremely low qualities where quality errors would approach the maximum of 6%, there would be little, if any, liquid carryover due to the small volume flow rates in the separator. Under these conditions, a modified so-called rotameter system can be used to measure separately the rates of flow for the liquid and the condensed vapor, as will be seen later. This feature of the system as described more particularly below, is seen to render the invention more flexible in this respect since both measuring systems can be used either as a mutual check or separately to extend the accuracy range.

Referring to the figure, there is illustrated a pipe 12 which carries wet steam in the direction indicated by the arrow, and which steam is to be sampled and vapor quality determined. Pipe 12 expands into a larger diameter section 14 to accommodate a separator 16. The latter consists of a sealed vessel of convenient shape as illustrated into which extends a sampling probe 18, which at one end 18a is open to the flow of the steam as is a pitot tube and whose other end 18b terminates within separator 16 wherein there is a continuous collection or sampling taking place of the steam flowing in pipe 12. Under the static flow conditions within separator 16, the water entrained in the steam will collect on the bottom of separator 16 so that there will be established within a pool of water 22.

A pair of static taps 24 and 26 leading to a differential pressure measuring device 28 permit the static pressure at the inside surface of probe 18 and the static pressure at the inside wall surface of tube 12 to be observed and compared. If the principal two-phase flow is relatively undisturbed, the static pressure of all steamlines, taken across the cross-section, must be equal. Under these conditions, except for small inequalities due to probe entrance losses and possible static head differences, both of which can be accounted for if necessary, the sample taken is representative of the steam flowing in pipe 12. As will be seen from the discussion below, it is possible to adjust conditions within separator 16 where the sample is being collected to insure a differential pressure of zero as measured by device 28.

Separator 16 is provided in addition, with a pair of pressure sensing taps 29 and 30 extending to pressure sensing device 31 to measure the pressure differential existing within separator 16 between the entrance to taps 29 and 30. It will be noted that tap 29 extends into the vapor portion of separator 16 while tap 30 terminates within the body of water 22. Should the level of water 22 be changed for some reason, this would be indicated by a change in the differential pressure measured by device 31. while on the other hand, an unchanging value would indicate a constant level. As will be seen, also, from the discussion below, it is possible by this apparatus to maintain a constant level of water 22 in separator 16.

The liquid and vapor are removed separately from separator 16 by way of tubes 32, and 34, respectively, through a sample cooler 36 which is cooled by a flow of cold water pumped through by way of lines 36a and 36b. The vapor in line 34 is condensed into a liquid at a reduced temperature and then through a control valve 38 where the rate of flow is controlled. The liquid then enters conductivity meter 42 where as will be seen later, the liquid is combined with the liquid extracted from separator 16 by way of tube 32.

The cooled liquid in tube 32 after passing through sample cooler 36 is passed through control valve 44 for similar flow control to conductivity meter 46. After leaving the latter the water is passed into meter 42 where it is combined with the water from line 34. The combined liquids leave meter 42 by way of line 48 and pass through a valve 52 to rotameter 54 where the combined flow is measured. A by-pass line 56 leading to an alternate rotameter 57 is provided from line 47 between conductivity meters 42 and 46. A valve 58 in line 47 and a valve 62 in line 56 permits the liquid from meter 46 to be by-passed directly into rotameter 57 for a reason to be later explained. In the normal operation of the apparatus just described, valve 58 is left open and valve 62 is maintained in a closed position. A pair of temperature measuring devices T1 and T2 indicate the temperature of the water entering waters 42 and 46, respectively.

In the operation of this apparatus, it is understood that after any change or adjustment is made, it is necessary to wait for steady state conditions to be established, usually about a minute, before any readings are taken or observations made. The total amount of sample withdrawn by probe 18 must be matched by the total sample withdrawn by way of lines 32 and 34 to obtain accurate readings by rotameter 54. This is accomplished by the total opening of control valves 38 and 44 and this condition would be indicated by a zero reading on the differential pressure measuring device 28. In addition, to withdraw vapor and liquid from separator 16 to maintain the level of water 22 at constant value in separator 16, control valves 38 and 44 are manipulated differentially until differential pressure measuring device 31 indicates a steady state condition, i.e., no change in the level of liquid 22. Thus by careful handling of valves 38 and 44, it is possible to establish uniform flow conditions in which the total of the sample withdrawn as measured by rotameter 54 is observed and a representative sample is taken from the fluid flowing in pipe 12. It should be noted at this point that the accuracy of the system is not a function of the effectiveness of separator 16. Since the liquid phase is mixed with the condensed steam before going through the last conductivity cell 42 anyway, liquid conveyed in the steam line 34 prior to the mixing will not affect the results.

Conductivity meters 42 and 46 are then read and their values are utilized in the mathematical relationship $$Q_s = 1 - \frac{C_m}{C_w}$$

where $Q_s$ is the quality in weight fraction of vapor to total weight in the test flow, $C_m$ is the conductivity as read from meter 42, and $C_w$ is the conductivity as read from meter 46.

In the system just described, the pressures existing in separator 16 are above that of atmospheric pressure, usually of the order of 500 to 100 p.s.i. for the steam conditions ordinarily investigated. Under these conditions, as is obvious, no pumping is required for the operation of this apparatus, as the fluids are released to atmosphere. In the event, however, conditions are such that there is little or no pressure differential to cause adequate flow, a pump may be utilized downstream of rotameter 54 to obtain the desired flow conditions.

Sometimes it is desired to allow the condensed vapor and liquid components of the sample to be directed independently and separately through different rotameters. One such time may be when the sample flow rate into separator 16 is very low and the separator effectiveness as a "separator" is close to perfect. This occurs under operating conditions resulting in low sample flow rates and/or high sample qualities, where the amount of liquid carry over in separator 16 through line 34 will be extremely small, approaching zero. Here, there will be very little fluid or gas motion in separator 16, allowing the liquid phase of the sample to drop from probe exit 18b down to liquid 22. With valve 58 closed and valve 62 open, the liquid and vapor components would be sent directly to rotameters 57 and 54, respectively. These rotameter readings will thus give a good sample quality and flow rate recording under these conditions. In addition, this flow arrangement permits the effectiveness of separator 16 to be measured if desired. By independently extracting the two phases in this fashion and taking a conductivity reading by meter 42, a less than perfect separation will yield varying degrees of a positive conductivity reading.

It will thus be seen that there has been provided a unique and improved way for measuring the vapor quality of wet steam with a high degree of accuracy and in a continuous manner. While the arrangement provides for the manual control of valves 38 and 44, it is readily apparent that automatic means can be devised to render the control automatic and continuous. In addition, although the invention has been described in relation to wet steam, it is realized that other fluid systems might find the invention applicable where the characteristics of the materials render the invention applicable thereto. Thus, it is seen that although preferred embodiments of the invention have been described, it is understood that many changes thereof may be made without departing from the principles of this invention, and the scope of the invention is to be defined only by that of the appended claims.

We claim:

1. Apparatus for sampling flowing wet steam comprising:
    (a) container means for collecting continuously a sample of wet steam separating at least some of the liquid phase from the sample;
    (b) means for withdrawing sample and the separated liquid phase separately from said container means;
    (c) means for measuring the conductivity of the withdrawn separated liquid phase;
    (d) means for condensing the withdrawn sample;
    (e) means for combining the condensed sample with the liquid withdrawn from said container means; and
    (f) means for measuring the conductivity of the combined liquids to permit determination of the vapor proportion by weight of the wet steam collected in said container means;
    (g) said withdrawing means including controllable flow means in each of the liquid flow lines for the condensed sample and the liquid withdrawn from said container means to permit selective control of total withdrawal of fluid from said container means and relative amounts of sample and the separated liquid phase.

2. The apparatus of claim 1 having means to indicate whether collection rate of wet steam in said container means is the same as the total rate of withdrawal of fluids from said container means, to permit compensating adjustment of said controllable flow means when said collection rate differs from the rate of withdrawal.

3. The apparatus of claim 2 having means to indicate changes in liquid level in said container means to permit operation of said controllable flow means so as to maintain a desired liquid level.

4. The apparatus of claim 3 in which vapor quality is determined from the relationship $$Q_s = 1 - \frac{C_m}{C_w}$$

where $Q_s$ is the vapor fraction by weight of the flowing wet steam, $C_m$ is the conductivity of the combined liquids, and $C_w$ is the conductivity of the withdrawn separated liquid phase.

References Cited

UNITED STATES PATENTS

| | | | |
|---|---|---|---|
| 2,671,343 | 3/1954 | Jacobs et al. | 73—29 |
| 3,021,427 | 2/1962 | Bayly et al. | 73—29 |
| 3,123,541 | 3/1964 | Donnell | 73—17 |
| 3,221,541 | 12/1965 | Osborne | 73—29 |

JAMES J. GILL, *Primary Examiner.*

C. IRVIN McCLELLAND, *Assistant Examiner.*

U.S. Cl. X.R.

73—53